3,310,838
BEAD REPAIR MOLD

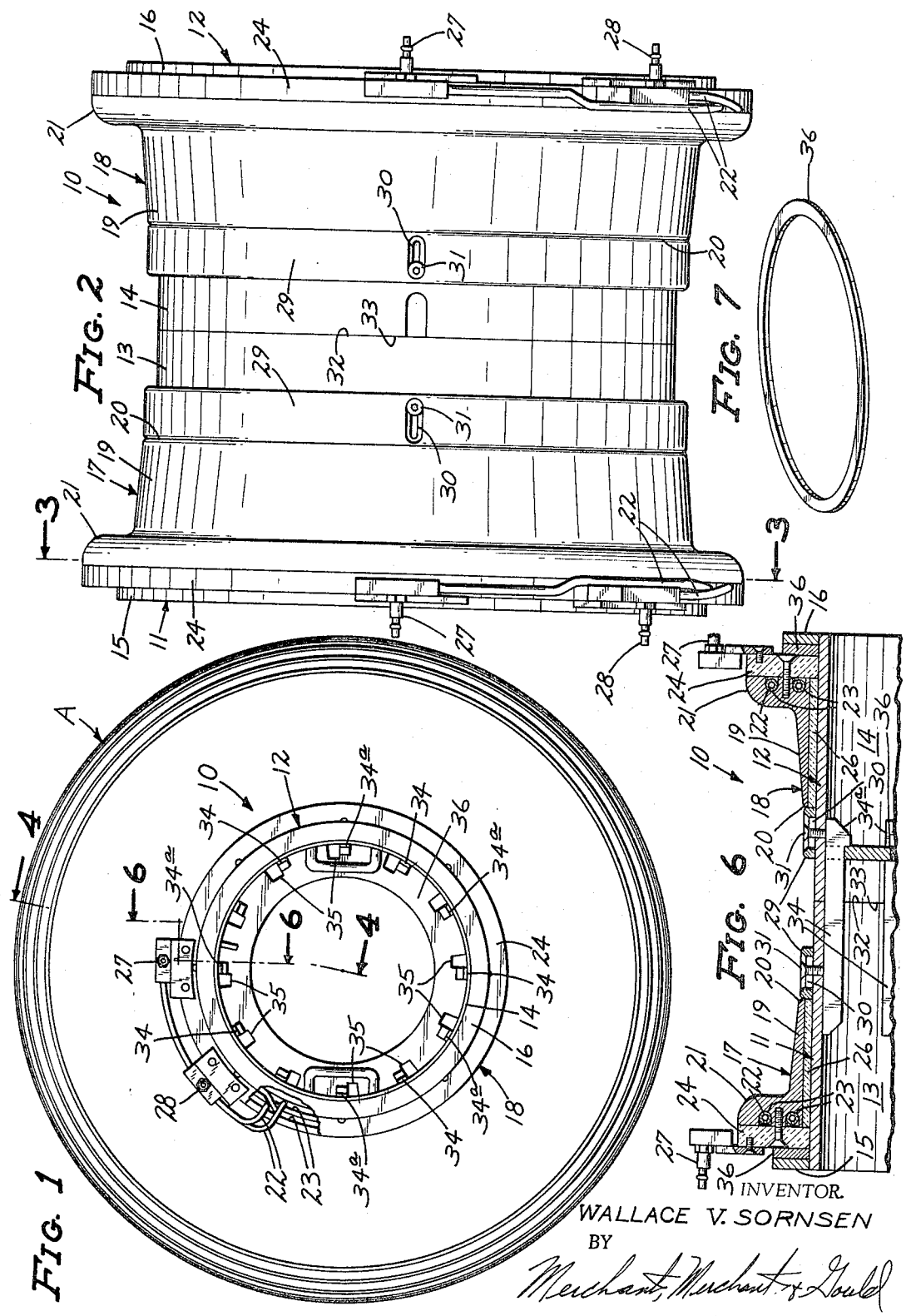

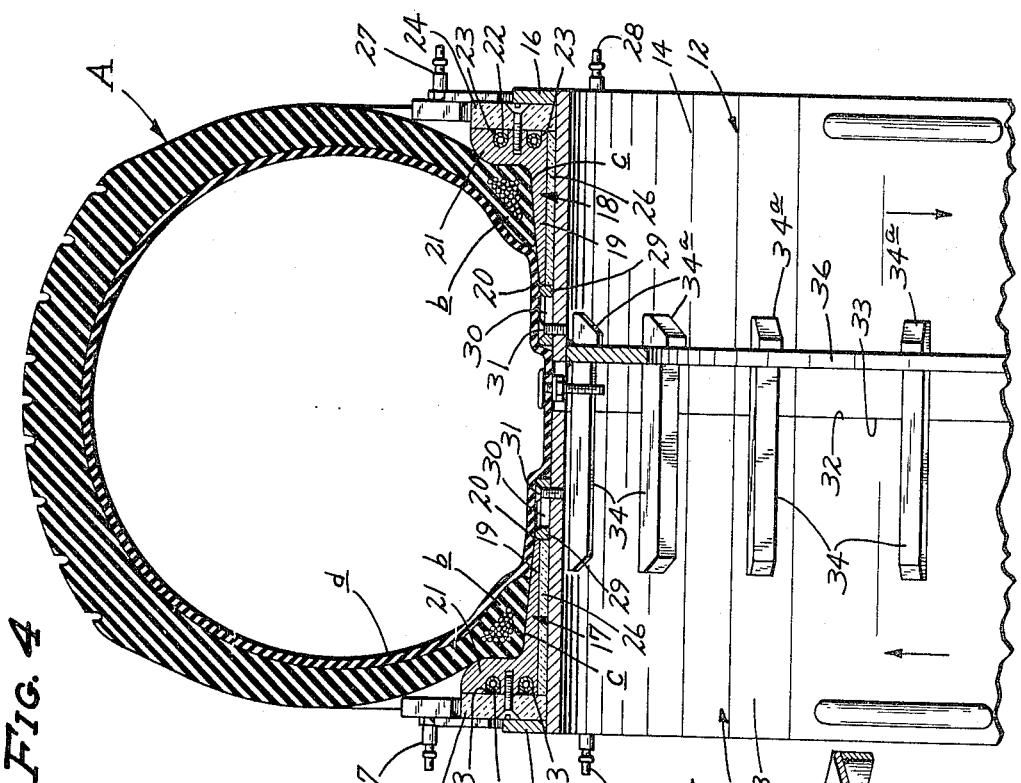
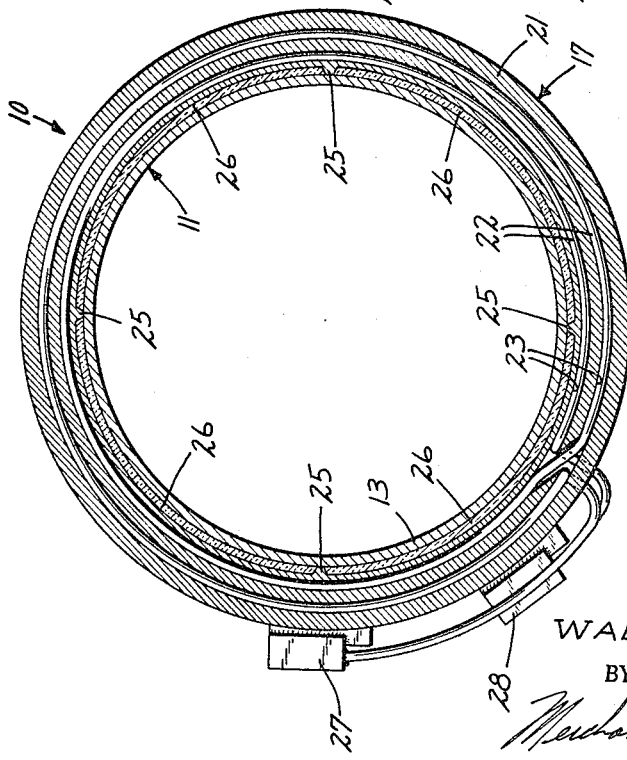
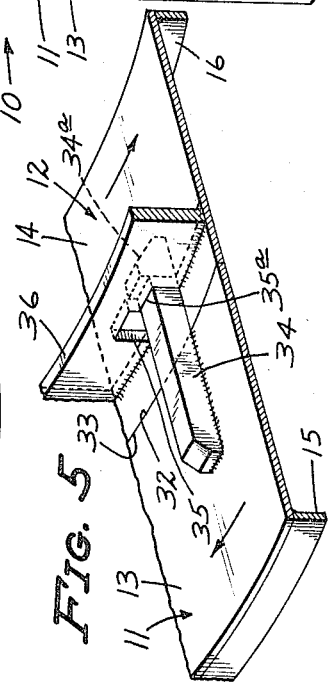

Wallace V. Sornsen, Minneapolis, Minn., assignor to Paul E. Hawkinson Company, Minneapolis, Minn., a corporation of Minnesota
Filed Apr. 26, 1965, Ser. No. 450,852
4 Claims. (Cl. 18—18)

My invention relates generally to tire repair equipment, and more particularly to bead repair molds for aircraft tires or the like.

Modern jet aircraft have considerable bulk and weight, and of necessity must land at relatively high rates of speed. Frequently during landing and/or subsequent braking of such aircraft, considerable damage may be imparted to the bead portion of one or more of the tires thereof. Such damage occurs due to the relatively high torque forces set up between the tire and the rim on which it is mounted. Preferably a tire must fit the rim on which it is mounted with a sufficient degree of tightness to prevent relative rotation of the tire with respect to the rim on which it is mounted. However, due to the differences of contraction of the tire with respect to the rim in the cold upper atmosphere and/or oversize dimensioning of the bead with respect to the rim on which it is to be mounted during manufacture, such is not always true, with the above damage the result.

It is therefore a principal object to provide a bead repair mold which conforms as close as possible to the diametric dimensions and cross-sectional contours of an aircraft rim on which it is to be mounted so as to assure a fit having a sufficient degree of tightness therebetween.

It is another object to provide a bead repair mold which is adaptable to receive and repair tires having like size bead diameters, but different size axial dimensions.

Another object of the present invention is to provide a device of the class above described which is rugged and durable in construction, simple and foolproof in operation, and inexpensive to produce.

The above and still further objects of my invention will become apparent from the following detailed specification, appended claims, and attached drawings.

Referring to the drawings wherein like characters indicate like parts throughout the several views:

FIG. 1 is an elevational view of my bead repair mold with a tire mounted thereon, portions thereof broken away;

FIG. 2 is an enlarged elevational view as seen from the circumference of my bead repair mold with the tire removed;

FIG. 3 is a view in vertical section as seen from the line 3—3 of FIG. 2;

FIG. 4 is a view in vertical section as seen from the line 4—4 of FIG. 1 on an enlarged scale;

FIG. 5 is an enlarged fragmentary view in perspective of a portion of my bead repair mold;

FIG. 6 is a view in vertical section as seen from the line 6—6 of FIG. 1, showing a different position of some of the parts; and FIG. 7 is a perspective view of a shim for varying the axial dimensions of the bead-engaging portion of my novel bead repair mold.

Referring with greater particularity to the drawings, the numeral 10 indicates in its entirety a bead repair mold for aircraft tires and the like. Mold 10 includes a pair of cooperating rim sections 11, 12 each having abutting, axially aligned, cylindrical felly portions 13, 14, respectively, and radially outwardly projecting flanges 15, 16 at the outer edges thereof.

A pair of annular bead-engaging mold elements indicated generally at 17, 18 are one each telescopically received over their respective felly portion 13, 14 with each thereof engageable with its respective flange 15, 16. As shown particularly in FIG. 4, each of the mold elements 17, 18 are identical in construction and comprise generally cylindrical portions 19 which taper toward their axially spaced inner edges 20. Formed on the axially outer edge of the portions 19 are circumferentially extended, radially outwardly projecting, bead-engaging flanges 21. For the purpose of imparting vulcanizing heat to the mold elements 17, 18 there are provided tubular conduits 22 which are received in recesses 23 formed in the flanges 21. Cover elements 24, formed from a suitable insulating material, are provided to retain the conduits 22 within their recesses 23 and to insulate the mold elements 17, 18 from their adjacent flange 15, 16, respectively. To further prevent the transfer of heat from the mold elements 17, 18 to their respective felly portions 13, 14, the cylindrical portions 19 of the mold elements 17, 18 are provided with a plurality of radially inwardly projecting lugs 25, see FIG. 3. Lugs 25 serve to space the cylindrical portions 19 from their respective felly portion 13, 14. Suitable insulation 26 is provided for the spaces between the lugs 25, cylindrical portions 19, and felly portions 13, 14. It will be noted by reference to FIG. 2 that conduits 22 each terminate in inlet and outlet fittings 27, 28, respectively, which are adapted to be connected to a source of heat supply such as a steam generator, not shown.

Anchoring each of the mold elements 17, 18 to their respective rim section 11, 12, is an annular stop member 29. Each of the stop members is telescopically receivable over its respective rim section 11, 12, and is adjustably secured thereto, in engagement with the inner edges 20 of mold elements 17, 18, by means of the axially extended, circumferentially spaced slots 30 and screw elements 31 which extend therethrough and have threaded engagement with the felly portion 13, 14 of their respective rim sections 11, 12.

When it is desired to mount a tire A which has had one or both of the beads b damaged on the mold 10, the beads b of tire A are in conventional manner prepared for vulcanization. Thereafter, the rim sections 11, 12 and parts associated therewith are inserted into the central opening c, one each from an opposite side, to a point where the inner edges 32, 33, respectively, are in abutting engagement. Maintaining such abutting engagement are a plurality of axially extended circumferentially spaced hook elements 34 carried by the rim section 11. The axially extended hook-equipped ends 34a of hook elements 34 are adapted to be received in apertures 35 formed in an annular radially inwardly projecting flange 36 which is carried by the rim section 12. Apertures 35 each have reduced portions 35a which engage the hook portions 34a of each of the hook elements 34 upon slight counter-rotation of rim sections 11, 12, as indicated by arrows in FIG. 5. At this time a tube d within the tire A is inflated to a suitable pressure and heat is applied to one or both of the beads b through the medium of the mold sections 17, 18.

For the purpose of accommodating tires having like bead diameters, but different axial dimensions, and adapting the mold 10 for such tires so it conforms as nearly as possible to the diametric dimensions and cross-sectional contours of the rim on which they are to be used, I provide the spacer elements 36, see FIGS. 6, 7. One or more spacers 36, depending on tire size, may be interposed between one or both of the flanges 15, 16 and the adjacent surface of its cooperating mold element 17, 18, to effectively vary the axial dimension therebetween. With the above arrangement the mold 10 more nearly conforms to the various size rims on which such tires are to be mounted and results in a repaired bead with a fit having the desired degree of tightness to prevent further damage thereto due to such relative rotation above described.

My invention has been thoroughly tested and found to be completely satisfactory for the accomplishment of the above objects and while I have disclosed a preferred embodiment thereof, same may well be capable of modification without departure from the scope and spirit of the appended claims.

What is claimed is:

1. In a bead repair mold for aircraft tires and the like:
    (a) a pair of cooperating rim sections each having abutting cylindrical felly portions and each having radially outwardly projecting flange portions at their outer edges,
    (b) a pair of annular bead-engaging mold elements one each telescopically received over the felly portion of one each of said rim sections and engageable with said flange portion thereof,
    (c) means for anchoring each of said mold elements to their respective rim sections,
    (d) means for imparting vulcanizing heat to said mold elements, and
    (e) means for securing said rim sections within the central opening of a tire with the inner edges thereof in said abutting relationship.

2. The structure defined in claim 1 in further combination with spacer means adapted to be removably interposed between the flange portion of one of said rim sections and the adjacent surface of its cooperating mold element whereby to effectively vary the axial dimension between said mold sections to accommodate tires of different widths.

3. The structure defined in claim 1 in which each of said mold elements comprises a generally cylindrical portion which taper toward their axially spaced inner edges, circumferentially extended, radially outwardly projecting, bead-engaging flanges at their axially outer edges, and relatively small circumferentially spaced radially inwardly projecting lugs which engage their respective rim sections and space said mold elements therefrom.

4. The structure defined in claim 3 in which the means for imparting vulcanizing heat to said mold elements includes tubular conduits imbedded within said bead-engaging flanges and terminating in inlet and outlet connections carried by said flanges.

References Cited by the Examiner
UNITED STATES PATENTS

| | | | |
|---|---|---|---|
| 2,077,506 | 4/1937 | Woock | 18—18 XR |
| 2,380,380 | 7/1945 | Bacon | 18—18 |
| 2,480,578 | 8/1949 | Hodges | 18—18 |
| 2,835,922 | 5/1958 | Fassero et al. | 18—18 |
| 2,871,518 | 2/1959 | Branick | 18—45 |
| 2,915,783 | 12/1959 | Fassero et al. | 18—18 |
| 3,133,317 | 5/1964 | Branick | 18—45 |

J. SPENCER OVERHOLSER, *Primary Examiner.*

J. HOWARD FLINT, JR., *Examiner.*